March 13, 1962 F. J. KINZELMAN Re. 25,134

ROTARY PRINTING PRESS FOR CONTINUOUS METAL STRIP

Original Filed March 30, 1955 3 Sheets-Sheet 1

INVENTOR.
Francis Joseph Kinzelman
BY
Kegan and Kegan
Attys.

ROTARY PRINTING PRESS FOR CONTINUOUS METAL STRIP

Original Filed March 30, 1955 3 Sheets-Sheet 2

INVENTOR.
Francis Joseph Kinzelman
BY
Kegan and Kegan
Attys.

March 13, 1962 F. J. KINZELMAN Re. 25,134

ROTARY PRINTING PRESS FOR CONTINUOUS METAL STRIP

Original Filed March 30, 1955 3 Sheets-Sheet 3

INVENTOR.
Francis Joseph Kinzelman
BY
Kegan and Kegan
Attys.

United States Patent Office

Re. 25,134
Reissued Mar. 13, 1962

25,134
ROTARY PRINTING PRESS FOR CONTINUOUS METAL STRIP

Francis Joseph Kinzelman, Northbrook, Ill., assignor to Jerome R. Share, Chicago, Ill.

Original No. 2,890,653, dated June 16, 1959, Ser. No. 497,837, Mar. 30, 1955. Application for reissue June 2, 1961, Ser. No. 115,861
28 Claims. (Cl. 101—178)

Matter enclosed in heavy brackets [ ] appears in the original patent but forms no part of this reissue specification; matter printed in italics indicates the additions made by reissue.

This invention relates to machines for operating on continuous metal strip, and more specifically to a rotary printing press for printing on continuous metal strip.

Printing, including lithographing, of continuous metal strip can provide great economy in the manufacture of a large variety of items made from such strip, and can make possible from the economic standpoint the manufacture of items which otherwise could not be marketed because of excessive cost. However, printing on metal strip presents many problems which do not occur in the printing of conventional materials, such as paper and fabrics, so that machines designed for the printing of paper and fabric webs are not satisfactory for use with webs of metal.

As in the case of other continuous web presses, a major problem encountered in design is the synchronization of the motion of the print roll, containing the image to be reproduced, with the motion or feed rate of the web. In general, this problem is solved in conventional presses by providing a common drive for the web and the print roll, the web being driven by feed rolls directly coupled to the print roll, both being driven by a common motive means. Although this type of mechanism is generally satisfactory in printing on materials commonly encountered for these purposes, it proves to be highly unsatisfactory for use in the printing of metallic strip in production operations. For one thing, metal strip is extremely heavy compared to conventional materials upon which printing is done, and it is difficult, if not impossible, to obtain constant-speed drives which have sufficient power to move the many tons of material which are frequently in process between the feed reel, from which the strip is uncoiled and fed through the press, and the take-up reel, upon which the strip is stored after processing in the press. This problem is aggravated by the fact that in the case of metal strip it is normally desirable to perform further operations after the printing operation but prior to storage on the take-up reel. Thus lacquering and baking commonly follow the printing operation, and the drive for the web must be capable of moving the long length of web which is thus being processed at any instant. Further, in order to produce an economically practical press for printing on metal strip, it is desirable to avoid any necessity for providing special types of drives for the strip itself, since the installations in which it is normally desired that the printing on such stock be done already have mechanisms for conveying the strip.

In addition to the economic difficulties in adapting conventional printing methods and machines to the printing of metallic strip, the latter type of printing operation presents severe problems which render conventional devices for producing proper register of the printed material impractical or inoperative. For example, it is virtually impossible to produce, in a metal strip of the magnitude used in conventional industrial fabrication of such strip, smooth and uniform motion throughout the length of the strip being processed. Such impulses as sonic vibrations travelling lengthwise of the strip produce sudden alternations of tension and slackness in any part of the strip. Heating and cooling of the strip as various operations are performed upon it produce more or less random expansions and contractions which add further to the differences in instantaneous speed at various points along the length of the strip. Creases and furrows are formed in the strip as it proceeds in its course through a series of guide rollers, the appearance and magnitude of such irregularities being non-uniform along the length of the strip. Because of these and similar factors inherent in the industrial handling of metal strip, even if there could economically be provided a drive for the entire strip which would synchronize the overall motion of the strip with the motion of the print roll producing repetitive images on the strip, there would still be no substantial assurance that each successive portion of the strip being subjected to the action of the print roll would be moving with the same speed as the peripheral speed of the print roll. Furthermore, even if the strip could somehow be driven at the point of printing contact, as by direct drive from the back-up roll or drum forming, with the print roll or transfer roll, the printing couple, the randomly occurring effects previously described would inevitably cause slippage of the strip on the back-up roll, or damage to the mechanism.

In the structure of the present invention, the drive which feeds the continuous metal strip over the back-up roll is independent of the printing train and is connected to the printing train only by the strip. The strip drives the back-up roll, and the print roll is in turn driven by a transmission which interconnects and synchronizes the rolls. In this manner, the print roll accurately follows the speed variations, if any, which occur in the strip, so that irregularities of motion of the strip as it passes through the printing couple are instantaneously reflected by corresponding irregularities in the motion of the plate roll, thus preserving the proper repetitive pattern length of the printed pattern on the strip, and also avoiding blurring and other deleterious effects caused by excessive sustained or instantaneous differences between the speed of the print roll and the speed of the strip.

Where the strip itself provides the entire drive for the printing mechanism of the press, as set forth above, it is necessary that the printing mechanism present to the strip a negligible mechanical load in order that the following of strip motion irregularities by corresponding irregularities in the motion of the printing mechanism may be maintained with accuracy without the necessity of relatively elaborate arrangements to prevent slippage of the strip with respect to the part of the printing mechanism which is driven directly by the strip. Thus if the strip is merely in frictional engagement with the back-up roll or drum, and the latter is geared by conventional gearing to the print roll, sudden changes of speed by the strip will merely produce slippage of the strip over the back-up roll, and proper relation between the motion of the strip and the motion of the print roll will be lost. In the present invention, there is provided a mechanism for driving the print roll in response to the motion of the back-up roll which minimizes the mechanical load on the strip, an auxiliary power source of a novel type being used to do the bulk of the work of rotating the members of the printing couple, the strip accordingly being used primarily to produce speed changes in the printing mechanism, rather than to provide the entire drive for the printing mechanism.

A further problem which becomes highly critical in the case of printing on metal strip is what may best be described as "long-term register." Conventional, or "short-term," register problems are in general concerned with the production of clear images, free of smears and smudges caused by variations in relative speed between the strip (or other web) and the plate roll, and of errors in register between successive impressions on the same part of the web, as in multi-color printing. Satisfactory short-term register is obtained in the present device by the mechanism described above. However, where the web upon which the printing is being done is metal strip, there are further introduced long-term register problems which are non-existent or neglible in the case of conventional printing webs.

The nature of the long-term register problem may best be understood by considering the cumulative effect of errors in short-term register which are so minute as to present no visible evidence of defect in register in any single pattern or any small number of adjacent repeated patterns. Suppose, for example that the peripheral speed of the print roll is minutely smaller than the speed of the web due, for example, to slippage in the short-term register transmission, the difference in speeds being so small as to produce a short-term register that is to all intents and purposes perfect, as regards completion of a single pattern or measurement of the spacing between adjacent repeat patterns, which reveals no significant difference from the repeat pattern length which is desired (the circumference of the print roll.) In such a case, despite the apparently accurate short-term register, when long lengths of strip are considered, the cumulative error begins to become appreciable, and is of particular importance where the pattern is small and the exact register of subsequent operations, such as stamping operations, with the printed pattern is important. For example, suppose that the ultimate product being fabricated is beverage bottle tops, and that the printed pattern consists of closely spaced discs, appropriate for the subsequent stamping of the bottle tops. Suppose further, for purposes of simplicity, that the machine performing the subsequent stamping operation does not itself create long-term register problems, i.e., it stamps out its patterns at intervals corresponding to the nominal or desired repetition rate on the cold or reference dimensions of the strip. (This assumption is of course unreal, but will serve to illustrate the nature of the long-term register problem.) Upon these assumptions, it will be found that after a long length of strip has been punched, the lack of register between the punching operation and the printing operation becomes apparent to the eye, and ultimately the two are completely out of register.

The problem of long-term or cumulative register is discussed above in connection with minute slippages or errors in the short-term register mechanism. However, there are many further effects in the operation of a metal strip press which, although negligible as regards short-term register, become important when cumulated over the long lengths of strip. Thus small wrinkles or waves which appear in the strip, particularly at the edges thereof, in the process of storing and feeding the strip on rollers, with consequent bending, produce an apparent shortening of the strip as it proceeds through the press compared to its cold or clean condition, the cumulation of this effect producing a long-term register problem. Likewise any slippage which may occur between the strip and the back-roll or drum which is energized by the strip will be cumulative.

A further problem of long-term register is created by the thickness of the metal strip being printed upon. Where the sheet or strip of metal is bent around the back-up roll, it has three effective lengths: the compressed length which is in contact with the back-up roll, the expanded length which is in contact with the print roll, and the pitch length, which is the true length of the material in its flat unstretched condition. If the short-term register control merely runs the print roll at the same circumferential speed as the back-up roll, it will be seen that the repeat pattern ultimately produced when the strip is later straightened will be substantially shorter than the desired pattern repeat length, due both to the fact that the back-up roll is run at a slightly slower speed than the actual speed of the strip, and the fact that the print roll prints upon a surface which is subsequently contracted.

The present device and method of operation eliminate long-term register errors due to all of these causes.

The factors producing long-term error discussed above will exist even where the printing operation is conducted under conditions wherein there is a negligible temperature rise in the strip as it passes through the press, as is the case where the press temperature is not substantially different from the ambient temperature, and the material being printed upon is so resilient as to produce negligible self-heating in the bending operations to which it is subjected in the press. However, it is sometimes desired to perform printing operations upon metal strip under conditions such that the web undergoes a substantial temperature change as it passes through the press. Consider now the effect on long-term register of expansion and contraction of the metal strip as it passes through the press. Consider first the portion of the strip which has not yet entered the press; this portion is essentially at room temperature, and may be considered to have a reference or normal dimensional condition. As this "cold" portion of the strip passes into the operating region of the press and is fed through appropriate guide rollers to the printing region, its temperature increases due both to the heat generated by the operation of the press and to the heat generated in the cold-working of the strip as it bends to follow the path defined by the guide rollers. The thermal expansion thus produced elongates each successive portion of the strip as it passes through the press. Thus the velocity of the portion of the strip passing through the press is greater than the velocity of the cold portion of the strip. Subsequent to its passage through the press, the strip is cooled, either by a special provision for such cooling, or by mere exposure to the ambient conditions. Thus, if the press is set up to produce any given repetition pattern (corresponding in general to the circumference of the print roll), the actual pattern spacing or repeat length as it appears on the strip after cooling is slightly less than the nominal repeat pattern length for which the press was supposedly set.

In accordance with the teachings of the present invention, any long-term register problems due to thermal expansion which may be encountered are solved by feeding the strip through the press while operating the print roll of the press at a circumferential speed sufficiently smaller than the speed of the portion of the strip in contact therewith to compensate for thermal expansion of the strip. In this manner, the desired spacing or pattern repeat length is obtained exactly in the cold completed strip. However, since the thermal expansion which occurs is not constant, varying with such factors as ambient temperature, friction in the operation of the press, slight differences in characteristics of portions of the strip, etc., there are further provided in the present device means for altering the speed of the print roll in accordance with changes in thermal expansion of the strip.

In accomplishing the objectives generally set forth above, there have been provided by the invention register control devices and methods which may advantageously be adapted to continuous web machines, particularly machines for operating on metal strip, other than the rotary press which is illustrated in the attached drawing and described below. The solution of the problems encountered in designing a rotary press suitable for printing on metal strip will be seen to be readily adaptable to other types of continuous web machines.

For a thorough understanding of the method and apparatus of the invention, reference is made to the single embodiment thereof illustrated in the appended drawing, in which.

Figure 1:
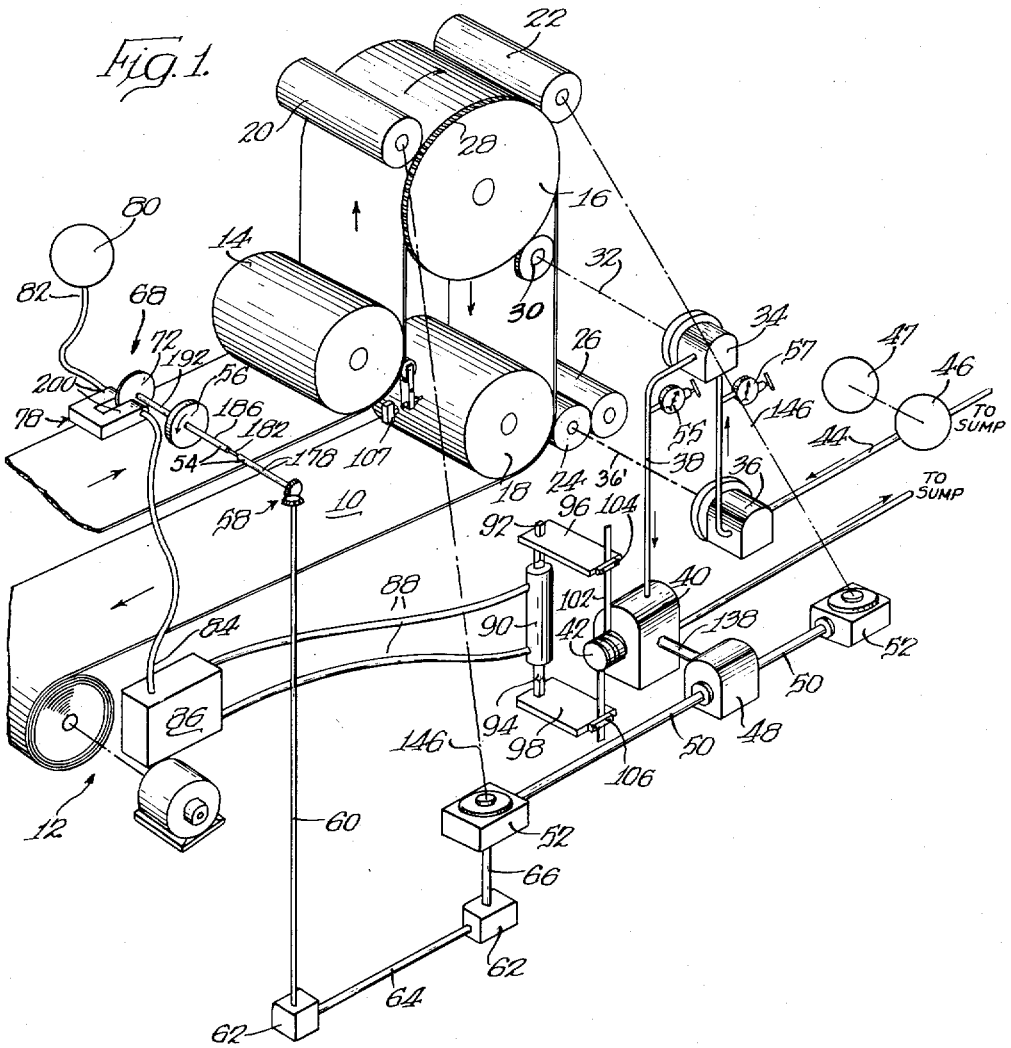
FIGURE 1 is a more or less schematic view in perspective of a rotary press embodying the invention.

Referring first to the schematic view of FIGURE 1, the strip 10 is driven or pulled through the press by external means (schematically indicated at 12 in FIGURE 1) serving as a drive for the strip independent of, and unconnected to, the press mechanism except through the strip itself. As the strip enters the press horizontally, it proceeds around a guide roller or idler 14, thence upward and around a back-up roller or impression drum 16, then again downward and around a further guide roller or idler 18 and thence outward parallel with the entering portion of the strip.

A pair of print rolls 20 and 22 are in contact with the face of the strip 10 at angularly spaced points on the circumference of the back-up roll or impression drum 16, each print roll 20 forming with the drum 16 a printing couple adapted for the making of suitable printed impressions on the strip 10. It will be understood that the print rolls 20 and 22 may be of any type; although the press illustrated is of the direct impression type, each printing train consisting only of the back-up roll, the print roll and appropriate inking rolls (not illustrated), it will be seen that the invention is applicable to presses in which transfer rolls are interposed between plate rolls and a back-up drum, as is conventional in offset printing. The printing process employed is immaterial to the system diagrammatically shown in FIGURE 1.

On the illustrated embodiment, the strip has a two-color pattern printed thereon by the print rolls 20 and 22. Thereafter, a lacquer coating is deposited on the face of the strip by a lacquer roll 24 fed by an appropriate feed roll 26, the idler 18 serving as the back-up for the lacquer roll 24.

Consider now the manner in which the printing mechanism shown in FIGURE 1 is driven. The back-up roll or drum 16 is provided with a gear or tooth portion 28 meshing with a pinion 30. The pinion 30 is rigidly coupled (as indicated by a dotted line 32) to the shaft of a constant displacement hydraulic pump 34. The shaft of the lacquer roll 24 is similarly connected, as indicated by dotted line 36', to an hydraulic motor 36 which is of the variable-displacement type, having a manual adjustment for the speed of the lacquer roll, which is not highly critical, and need not be otherwise controlled. (It will be understood that since the pumps or motors 34 and 36 are of the type manufactured for hydraulic drive and transmission systems, wherein there is an exact correspondence between displacement and shaft motion, these elements are capable of serving the function of either a pump or a motor, depending upon whether the shaft is employed to drive the fluid, or the fluid is employed to drive the shaft. For convenience of reference, therefore, the terms "pump" and "motor" are herein employed in respect to these hydraulic devices in accordance with the function served in the present apparatus, rather than as a structural distinction.) Connected in series with the pump 34 and the motor 36 by piping 38 is a variable-displacement motor 40, provided with a rotary displacement-adjusting member 42. It will be understood, of course, that the motor 40, for any given setting of the adjustment 42, has a constant displacement, the general operation being similar to that of the pumps or motors 34 and 36. However, the amount of this constant displacement is variable by adjustment of the member 42, the device thus being called a "variable-displacement" device. The inlet of the pump 36 is connected by piping 44 to the outlet of a constant-force pump 46, which is driven by an electric motor 47, the force exerted by the pump being manually variable. The input of the pump 46 and the outlet of the motor 40 are connected to a suitable sump (not shown). The output shaft of the motor 40 is coupled to a gear box 48, having a doubly extending shaft 50 coupled through additional gear boxes 52 to the print rolls 20 and 22, as indicated by dotted lines 146.

It will be seen that for any given adjustment of the displacement-adjusting member 42 (whose function will be later described) the drum 16 drives the print rolls 20 and 22 and the lacquer roll 24, and that any changes in speed of the back-up roll or drum 16 are simultaneously reflected in corresponding changes in the speed of the print rolls and the lacquer roll. Since the back-up roll is driven by the strip 10, any irregularities in the motion of the strip 10 are reflected in corresponding irregularities of the entire press mechanism. The accuracy or efficiency of the following of strip motion irregularities by the mechanism is greatly enhanced by the provision of the pump 46. In the absence of this pump (i.e. by connection of the inlet of the pump or motor 36 to the sump to which the outlet of the pump or motor 40 is connected), the system would work in a similar manner, but in this event the entire mechanical load of the printing mechanism would be driven through the frictional coupling between the strip 10 and the back-up roll 16. In the absence of relatively elaborate provisions against slippage between the strip and the roll, the slippage occurring in normal constant operation of the device would greatly increase the cumulative or long-term errors in register. Furthermore, in the event of rapid changes in the speed of the strip, the inertia of the mechanism would produce substantial slippage if the entire mechanical load of driving the mechanism were imposed on the strip. The pump 46 serves as an auxiliary drive arranged to exert a force just sufficient to drive the press mechanism in the absence of the strip. The pump 46 is provided with a manual adjustment for the constant force exerted by it. This adjustment is made while the apparatus is operating, by setting the force of the pump 46 at a value sufficient to create zero pressure drop across the pump 34 at the speed of operation, as indicated by pressure gauges 55 and 57 on either side of the pump 34, so that the system is driven by the strip itself, although the auxiliary drive provided by the pump 46 prevents the presentation of any substantial mechanical load to the strip 10. When the press is in operation, the pressure exerted by the pump or motor 34 at the outlet side in the absence of pump 46 is balanced by a substantially equal pressure produced by the pump 46 at the inlet side of the pump 34, this condition essentially corresponding to the condition of minimum slippage of the strip 10 with respect to the back-up roll or drum 16, both in response to transient changes and over any long term.

It will be seen that the system thus far described will be highly effective in producing short-term register, i.e., synchronization of the motion of the strip with the operation of the press mechanism, thus preventing defects of a short term nature, either within a single pattern, or as between patterns which are close together on a strip. By suitable adjustment of the adjusting member 42, the variable-speed transmission which thus interconnects and synchronizes the print rolls with the back-up roll may be made to have a speed ratio such that the print rolls 20 and 22 are driven at the speed of the strip (i.e. the circumferential or peripheral speeds of the print rolls are identical with the linear speed of the strip). Rapid or slow changes in strip speed will be accompanied by corresponding changes in speed of the printing mechanism.

Despite the accuracy of the system thus far described in producing high printing quality and proper short-term register, it does not fully solve the problem of long-term register, previously discussed, where extremely long strips are employed. Because of minute slippage (leakage) in the hydraulic transmission, wrinkling at the edges of the web, and similar effects, there appear over long lengths of strip cumulative errors in register or pattern repeat length which are negligible from a short-term standpoint. Likewise, in cases where temperature effects are substantial, the fact that the "hot" portion of the strip (the portion within the press) proceeds at slightly higher speed than the "cold" portion of the strip (the portion of the strip which has not yet entered the press mechanism) causes no difficulties where short lengths of strip are involved. Where the length of the web is relatively short, even the aggregate of the small errors in pattern repeat length introduced by any of these causes will not be substantial. But the cumulative error introduced by such factors in long lengths of strip becomes very substantial in the absence of any special provision. With the present device, slight adjustments of the member 42 may be made, thus changing the speed ratio between the back-up roll or drum 16 and the print rolls 20 and 22, to run the print rolls 20 and 22 at a circumferential speed sufficiently smaller than the linear speed of the hot portion of the strip so that errors, including thermal expansion of the strip, if any, are compensated for, and the strip, upon subsequent contraction, will have the exact spacing or repetition length desired. Although manual adjustment of the speed ratio is of course possible, this is relatively impractical without the provision of some suitable means for measuring relatively minute variations in pattern repeat length. Furthermore, a manually operated adjustment of this type would be impractical for correcting errors of an impulse nature, such as the appearance of wrinkles, etc, in the strip, thus making the strip effectively shorter over short lengths, or brief slippages of the web with respect to the printing train. Furthermore, in cases where temperature effects are substantial, in order to make manual operation accurate, it would be necessary to maintain a constant temperature in the hot portion of the strip, since variations in thermal expansion would upset the exactness of the register.

In the present device there is provided an effective and accurate indicator for sensing variations or errors in long-term register in the nature of differences between the cumulative length of web passing through the press and the cumulative peripheral distance traveled by the print roll; and there are further provided means for responding to the sensing of such deviations by altering the speed ratio between the back-up roll and the print rolls to restore and maintain the long-term register.

Extending transversely of the cold or clean portion of the web or strip which is about to enter the machine is a flexible shaft 54. Mounted on this shaft for rolling motion in the direction of the motion of the strip 10 is a wheel 56.

The shaft 54 is geared at 58 to a shaft 60 which is coupled by suitable coupling boxes 62 and shafts 64 and 66 to one of the gear boxes 52. The wheel 56 thus is at all times rotated in exact synchronism with the print rollers 20 and 22. As indicated by arrows in FIGURE 1, the direction of rotation of the wheel 56 is such that if the strip 10 were stationary, the wheel would roll down the length of the strip away from the press mechanism. The flexible shaft 54 is selected to have substantially complete flexibility over a considerable range of bending, so that the wheel 56 is free, over a small range, to move back and forth in position on the strip. (Obviously such motion is actually circular around the gears 58 as a center, but the range of motion employed is so small that the motion is substantially linear in the direction of motion of the strip 10.) It will be seen that longitudinal motion of the wheel 56 will be determined by the relation between the circumferential speed of the wheel 56 and the linear speed of the strip 10 with which the wheel 56 is in contact, the strip 10 forming the support for the wheel 56, and the restoring force of the flexible shaft 54 being negligible, so that there is no slippage of the wheel on the strip. When the cold portion of the strip is moving faster than the circumferential speed of the wheel 56, the wheel 56 will move toward the press mechanism; conversely, if the circumferential speed of the wheel 56 exceeds the longitudinal speed of the strip 10, the wheel is moved away from the mechanism of the press.

Thus it will be seen that the direction of motion of the wheel 56, if any, serves as an indicator of any discrepancy between the speed of the cold web passing into the press and the circumferential speed of the print roll; after the wheel has once been placed in its original position, its position at any given time constitutes an indication of the cumulative error in register, i.e., the wheel 56 serves as a differential sensing means responsive only to differences between the cumulative length of web passing through the press and the cumulative peripheral difference traveled by the print roll. The cumulative indication thus given could of course be used in connection with manual adjustment of the relative speeds of the back-up roll 16 and the print rolls 20 and 22 to correct errors in long-term register so indicated. This might be done by continual observation of the position of the wheel, accompanied by appropriate manipulation of the adjusting member 42 to restore exact long-term register. Alternatively, suitable alarms might be provided to call to the attention of the operator of the machine the existence of such deviations, so that manual correction could be made.

However, there is further provided in the present machine a system for automatically making the corrections of deviations in long-term register, so that the interposition of action by an operator is not normally required, the machine itself automatically remaining in long-term register. In the present device, the longitudinal position of the wheel 56 is continually sensed by a sensing means generally indicated at 68. Attached to the wheel 56 by a rigid shaft 192 forming an extension of the flexible shaft 54 is a slightly smaller wheel 72. One edge of the wheel 72 moves between the arms of the yoke 78. A stream of air from an air supply 80 of constant pressure is blown across the gap of the yoke 78 by means of tubing 82. The air stream creates a pressure in an oppositely disposed tubing 84 which is connected to a pressure-responsive control mechanism 86. The control mechanism 86 is connected by suitable tubes 88 to a cylinder 90 having therein a piston (not shown). The control mechanism 86 and the piston and cylinder 90 are not illustrated or described herein in any detail, since these components are commercial available as a unit for converting the pressure within a tube such as tube 84 to a corresponding position of the piston within the cylinder, the piston being provided with extensions 92 and 94 at opposite ends of the cylinder. To the extensions 92 and 94 are secured brackets 96 and 98 between the ends of which extends a flexible tape 102, the central portion of which is wrapped tightly on the adjusting member 42.

The wheel 72, by interposition of the edge thereof to a greater or lesser extent in the path of the air stream from the tubing 82, serves to very the pressure in the tubing 84, the steady-state value of the pressure in the tubing 84 constituting a signal having a characteristic value for each longitudinal position of the wheel 72. It will be noted that the placing of the auxiliary sensing wheel 72 outward from the primary wheel 52, only the latter of the two being in contact with the web, increases the sensitivity of the device, since the wheel 72, for any given longitudinal motion of the wheel 56, will move a somewhat greater longitudinal distance than the wheel 56 by reason of the fact that the motion is not entirely longitudinal, but has a circular component around the gears 58. Additionally, it is highly desirable that the wheel 56 be mounted centrally of the web or strip 10, since the central portion of the strip more closely conforms to the "clean" condition (i.e., free of wrinkles and irregularities) than do the edges. The provision of the auxiliary wheel 72 permits the mounting of the yoke 78 (in a manner later to be described in connection with other figures of the drawing) at one side of the machine, thus eliminating any possible necessity for the use of long, and possibly unstable, mounting means. Furthermore, since the dimensional stability of the wheel 56 is of considerable importance to proper operation, the wheel 56 is of relatively thick stock, while the wheel 72 has no mechanical load, and accordingly may be extremely thin, thus permitting the use of a yoke 78 with a very small gap, thus again contributing to the sensitivity of the device.

Consider now the effect of the appearance of a discrepancy in long-term register between the web or strip 10 (i.e., the cold and clean portion thereof represented by the portion which is about to enter the press mechanism) and the print rolls 20 and 22. Since errors in long-term register can occur as a result of a variety of different factors, and the exact manner of operation of the system may vary slightly depending upon the nature of the causation of the discrepancy, a few examples may advantageously be discussed. In this discussion, for purposes of aiding in clear understanding of problems encountered in printing on metal strip, and of the manner in which the present method and device meet these problems, some typical numerical examples will be stated, but it will be understood that the numerical values selected are purely arbitrary.

Consider first a register discrepancy which appear as a result of some factor of an impulse nature. Thus, for example, suppose that a sonic vibration, or a sudden change in cooling rate of some portion of the strip beyond the press suddenly advances the strip by an inch, a jerking or pulse-type irregularity in motion which is commonly observed in long metal strips. The short-term register mechanism previously described will follow the bulk of this change, so that in the main the long-term register will not be affected. However, due to such factors as minute slippage, and small leakage through the pumps and motors such as 34 and 40, a small discrepancy will exist between the distance traveled by the strip 10 through the press and the circumferential distance traveled by the print rollers 20 and 22 during the temporary speed change. This difference may be of the order of a few hundredths of an inch or less and may be imperceptible as regards any visual defect in printing or alteration of the pattern repeat length. Nevertheless, the cumulation of such differences would result in substantial long-term register problems. In the present system, upon the occurrence of such a discrepancey, i.e., a small and temporary advance of speed of the strip which is not completely followed by the short-term register device, the wheels 56 and 72 are slightly advanced toward the press mechanism. Upon disappearance of this pulse-type acceleration, the wheels would remain at this new position except for the operation of the sensing means 68 and the corrective apparatus previously described. The advance of the wheel 72 acts to reduce the flow impedance of the gap in the yoke 78 so that the pressure in the tubing 84 is increased. This increase produces appropriate motion of the extensions 92 and 94 to rotate the control member 42 by means of tape 102 in the appropriate direction to change the speed ratio of the described transmission interconnecting the back-up roll 16 with print rolls 20 and 22 to speed up the print rolls, the amount of such speed increase being dependent upon the extent to which the wheel has been displaced. Thereupon the print rolls 20 and 22 are running faster than the strip 10, and the wheel 56 and the wheel 72 commence to return to their former position. As the wheel 72 re-enters the gap in the yoke 78, the flow resistance of the gap again commences to increase toward its original value, and the speed of the print rolls 20 and 22 is reduced, and ultimately equilibrium is again established with the print rolls 20 and 22 moving at the same rate of speed as the strip 10, the interval during which the print rolls were running at greater speed than the strip having compensated for the original slippage, so that there is no differential between the cumulative or total distance traveled by the strip and the cumulative or total periphery travel of the print rolls. The manner in which the system will respond to rapid temporary diminutions of speed of the strip will be obvious, insertion of the strip further into the gap in the yoke 78 increasing the flow resistance of the gap.

It will be noted that in principle the long-term register control could be made sufficiently sensitive and fast-acting to follow rapid short-term speed changes. That is to say, in principle, the short-term register control might be eliminated, and what may be termed the "walking wheel" register control might be employed as the sole control. However, it is found that attempts to speed up the response time of the walking wheel control to enable it to follow fast speed changes by the strip sufficiently well to prevent smudges and similar printing defects of a short-term register nature produce instability of operation, i.e., hunting. The pneumatic system illustrated is extremely stable and admirably suitable for the purpose.

Consider next the operation of the control system in the case of difficulties in long-term register caused by such factors as leakage in the hydraulic short-term register control and thermal expansion. Although thermal expansion problems are not always encountered, the manner in which this problem is solved will serve well to clearly illustrate the manner in which the apparatus solves problems of continuous, as opposed to transient, sources of error. Suppose that a repetition or pattern length of 20 inches is desired, the circumference of the print roll being 20 inches. The 20 inch repetition pattern is of course desired on the finished strip, i.e., the strip which has been printed upon and thereafter cooled. Suppose further that the temperature rise of the strip between the cold condition in which it enters the press and its temperature during the actual printing operation is 100 degrees C., a reasonable assumption to serve as an example. Suppose further that the material, for example steel, has an expansion coefficient of $10^{-5}$. If no special provision is made for long-term register, i.e., if the circumferential speed of the print rollers 20 and 22 is made exactly equal to the speed of the portion of the strip passing over the back-up roll 16, it will be found that after the strip is cooled, the repeat length of the pattern will be 19.98 inches. If the strip is later fed to a machine which punches out, for example, fixed length of the strip, it will be found that if the subsequent machine is designed to repeat its operation at intervals corresponding to exactly 20 inches on the strip, after about 100 feet of strip have passed through, the machine will be stamping out pieces which are more than an inch out of register with the printing previously done. Such a discrepancy is obviously intolerable in the case of any work requiring considerable relative precision, such as the fabrication of beverage bottle tops.

In order to obtain accuracy of the repeat length of 20 inches in the ultimate cold finished strip, it is necessary that rather than moving one revolution each 20 inches of hot strip passing through the press, the print rolls must move one revolution each 20.02 inches of hot strip. This objective is accomplished by the present control.

The manner in which the long-term register control preserves the proper long-term register in the presence of factors such as thermal expansion (where this factor is substantial) and variations in thermal expansion, and similar effects such as hydraulic transmission leakage and changes in such leakage, which would otherwise destroy the propriety of the register, will be readily understood. The gearing in the boxes 62 and the couplings 53 is so selected in the usual case (an exception to which will be discussed below), that the rotational speeds of the walking wheel 56 and the rollers 20 and 22 are in inverse proportion to their diameters. In the ensuing discussion, reference will be made primarily to temperature effects, the application of the explanation of the operation to error sources such as hydraulic slippage being easily understood. Consider now the commencement of operation of the press, when operation is started on the forward end of a strip which has been threaded through the rollers of the press. At this point, the mechanism of the press is of course cool, and there is substantially no temperature difference between the portion of the strip within the press and the portion outside the press. The wheel 72 is so located that its rearward edge is substantially in the center of the air stream between the arms of the yoke 78, so that movement of the wheel 72 in either longitudinal direction will change the pressure in the tube 84 in a corresponding direction. The action of the pneumatic system operating through the control mechanism 86 on the cylinder 90 through the tubing 88 will automatically adust the position of the control member 42 to provide a transmission ratio between the back-up roll 16 and the print rolls 20 and 22 such that the circumferential speeds of these rolls are essentially equal. This is achieved by a preliminary adustment or setup of the machine. This adjustment consists merely of opening a pair of clamps 104 and 106 which secure the ends of the tape 102 to the brackets 96 and 98, manually adjusting the control member 42 to produce equality between the circumferential speeds of the print rolls and the back-up roll, and then reclamping the ends of the tape 102 by means of the clamps 104 and 106, with the piston and cylinder 90 in the median position, this median position being obtained either by adjustment of the air pressure of the source 80 or by a suitable adjustment provided for this purpose on the control 86. Thereafter, motion of the piston upward or downward in the cylinder 90 will produce transmission ratio changes in either direction over a range sufficient to compensate for any long-term register problem which may be encountered. It will be noted that this adjustment, once made, need not be repeated for various sizes of print rolls 20 and 22. When substitution of print roll sizes occurs, at the same time there are substituted in the couplings 52 appropriate gears to maintain the circumferential speed of the print rollers equal to the circumferential speed of the wheel 56. This gear substitution also holds constant the relation of the circumferential speed of the back-up roll to that of the print rolls 20 and 22 for any given setting of the control member 42.

Now consider what happens when operation of the press is commenced by actuation of the drive mechanism 12 which feeds or draws the web or strip 10 through the press. As operation commences, all of the parts are in exact synchronism, the strip moving at the same velocity through its entire length, and the circumferential speed of the print rolls being exactly equal to the speed of the strip in contact with the print rolls, which is the same as the speed of the portion of the strip which has not yet entered the machine, so that no immediate motion of the walking wheel 56 occurs. Shortly, however, the factors previously discussed may, for example, increase the apparent velocity of the strip as seen by the back-up roll or drum 16, and the speed of operation of the print rolls 20 and 22 is accordingly increased. However, this increase is likewise reflected in the circumferential speed of the walking wheel 56, and the wheel 72 accordingly begins to move into the yoke 78, since the speed of the strip 10 which has not yet entered the press mechanism has not been changed. This motion of the walking wheel now changes the transmission ratio between the print rolls and the back-up roll by means of the control member 42 in the direction to slow up the print rolls 20 and 22. This compensatory action continues until equilibrium is reached. After the mechanism has acted to properly adjust the speeds, the walking wheel will again be stationary, the circumferential speeds of the print rollers 20 and 22 again being the same as the speed of the flat portion of the strip, as when operation was first commenced. Since the portion of the strip in the press moving at slightly greater velocity than the flat portion of the strip, the former moves very slightly faster than the surface of the print roll in contact with it. However, it has been found by extensive tests in commercial operation that no smudging, smearing, or other print imperfection will be discernible to the eye if the speed of the strip and that of the print roll do not differ by substantially more than about 2½%.

The operation of the control does not merely establish a final equilibrium which will produce the desired repetition length in the printed strip as sold, but in addition compensates for any minute errors which may have occurred prior to the reaching of equilibrium. This is due to the inherent manner of operation of the walking wheel control described. Any state of equilibrium in the system must obviously be represented by a position and speed of the walking wheel wherein it is completely stable, i.e., a position wherein the circumferential speed of the rollers 20 and 22 is identical with the linear speed of the cold portion of the strip. Also, in any state of equilibrium the wheel 72 has a fixed position which is determinative of the position of the piston in the cylinder 90, and thus of the control member 42.

Some of the causes of loss of long-term register which occurs when metal strip is printed upon in conventional presses are set forth by way of examples above. They exemplify the various general types of long-term register problems, to illustrate generally the manner in which the present device operates. In practice, there are many additional factors present in a normal industrial operation which the present control automatically eliminates as sources of difficulty.

It will be observed that the control system, although peculiarly well adapted for the present purposes, is not necessarily limited in its application to the particular type of machine shown, but may also be employed with any other machine for performing repeated operations on metal strip. Thus the long-term control described might advantageously be employed with continuous web machines incorporating operating members other than print rolls. For example, the application of such a control system to preserving the proper register in a subsequent device for operation on the same strip, such as a cyclically operating punch press, will readily be seen. Again a differential sensing means such as the walking wheel, responsive to the differences between the cumulative length of the web and the total length of web corresponding to the integrated cycling of the punch or other operating member, would be employed to increase the speed of the cyclic operation when a difference is sensed, until the lengths are again equal. Furthermore, although the particular arrangement shown is highly advantageous both from the point of view of economy of fabrication and simplicity of operation, it will be seen that equivalent structures may be devised, rolling members other than wheels being employable along with means other than those illustrated for yieldingly mounting the rolling member in rolling contact with the web.

In addition to the problems of long-term register which are solved in the manner above described, the present machine also permits the obtaining of any desired pattern repeat length without the necessity of providing an excessive variety of print roll sizes. In conventional presses, the pattern repeat length is equal to the circumference of the print roll. Since it is expensive, and sometimes prohibitive, to have available a print roll of a size corresponding to any exact pattern length which may be desired, there have been devised in the past various presses and auxiliaries for permitting the variation of the pattern repeat length while employing a single print roll. The present device makes such a provision in a manner which is not only extremely simple and reliable, but which in addition utilizes the properties and structure which are also employed to produce long-term register.

It will be remembered, in the discussion above, that it was stated that the walking wheel 56 is geared to the print rolls 20 and 22 with a ratio inverse to the circumference of these elements, so that the peripheral or circumferential speeds of these two elements would be at all times equal. Consider now the effect of reducing the diameter of the wheel 56 by a small amount such as 1%. This will decrease the peripheral speed of the wheel 56 with respect to that of the rollers 20 and 22 by a corresponding amount. However, assuming other conditions of operation to be unchanged, upon commencement of operation in this condition the walking wheel will commence to "walk" toward the press mechanism and away from the yoke 78. Under these conditions the control system acts to adjust the member 42 to increase the speed of the rolls 20 and 22 with respect to the speed of the drum 16, and thus with respect to the speed of the strip 10. An equilibrium will be reached in which the circumferential speed of the wheel 56 will be equal to the linear speed of the cold portion of the strip 10, the circumferential speed of the print rolls will then be, in the example taken, 1% greater than the speed of the cold portion of the strip, thus reducing the pattern repeat length by 1%. In this example, it will be noted that again the pattern repeat length will be held at 99% of the circumference of the print rolls irrespective of thermal expansion and other sources of long-term register difficulties. In a similar manner, the pattern repeat length may be made longer than the circumference of the print rolls by enlarging the walking wheel 56. As previously stated, it has been found that no readily obvious imperfections in printing quality result from discrepancies of up to 2½% between the speed of the print rolls and the speed of the portion of the strip instantaneously in contact therewith. Thus, given a set of print rolls graded in size with as much as 5% gradation in succeeding sizes, it is possible to produce accurately any desired exact repetition pattern length within the range of the set of rolls. As an example, in one embodiment of the device illustrated, there were provided a set of print rolls graded in successive tenths of an inch from 4 inches to 8 inches in diameter, with corresponding gears for substitution in the couplings 53 similarly graded to produce equality of the peripheral speeds of the print rolls and the walking wheel when employing a standard walking wheel of 3,500 inches diameter. When employing the standard walking wheel, the pattern repetition rate produced by the press was equal to the circumference of the print roll (including the plate or form secured thereto), these repeat lengths being 12.57 inches for the smallest print roll, 12.88 inches for the next larger print roll, 13.20 inches for the next, and so on, the maximum repeat length being 25.14 inches, for the 8 inch diameter print roll. In order to interpolate between these values of repeat length, it is merely necessary to machine from suitable hardened tool steel a simple wheel with the diameter being the diameter of the standard wheel times the ratio of the special repeat length desired to the circumference of the print roll employed. The machining of such a special wheel is obviously infinitely less expensive and time-consuming than the machining or fabrication of a new print roll, as otherwise would be required for special pattern length. The operation of the web being printed upon and the print rolls at slightly different speeds will not produce a large degree of distortion of the material being printed, so long as the discrepancy between the speeds is retained within the limits described above. However, if desired, the plate on which appears the material being printed may be altered by elongating the characters to be printed (elongation referring to the direction of rotation of the roller) if the repeat length is to be less than the circumference of the roller, or compressing the characters if the repeat length is to be greater than the circumference of roller.

In the schematic drawing of FIGURE 1, there is also shown a sensitive switch 107 adapted to sense the presence of coarse welded seams and similar gross irregularities. The switch is coupled (by means not shown) to the print rolls 20 and 22 to raise the print rolls for a short time upon the sensing of such irregularities, thus preventing damage to the printing train as a result thereof.

Persons skilled in the art will readily adapt the basic conceptions disclosed and discussed above to the design of printing presses and other continuous web machines, particularly for working on metal strip, for different appearance and details of design from that shown in the drawing. Likewise, persons skilled in the art will readily design and construct presses of the type shown in the schematic drawing of FIGURE 1 employing a variety of particular forms for components shown more or less schematically in FIGURE 1 and supports and frames for the various components. Nevertheless, for purposes of completeness, there is illustrated in the succeeding figures of the drawing, now to be described, a particular mechanical construction for the press shown schematically in FIGURE 1.

Figure 2:
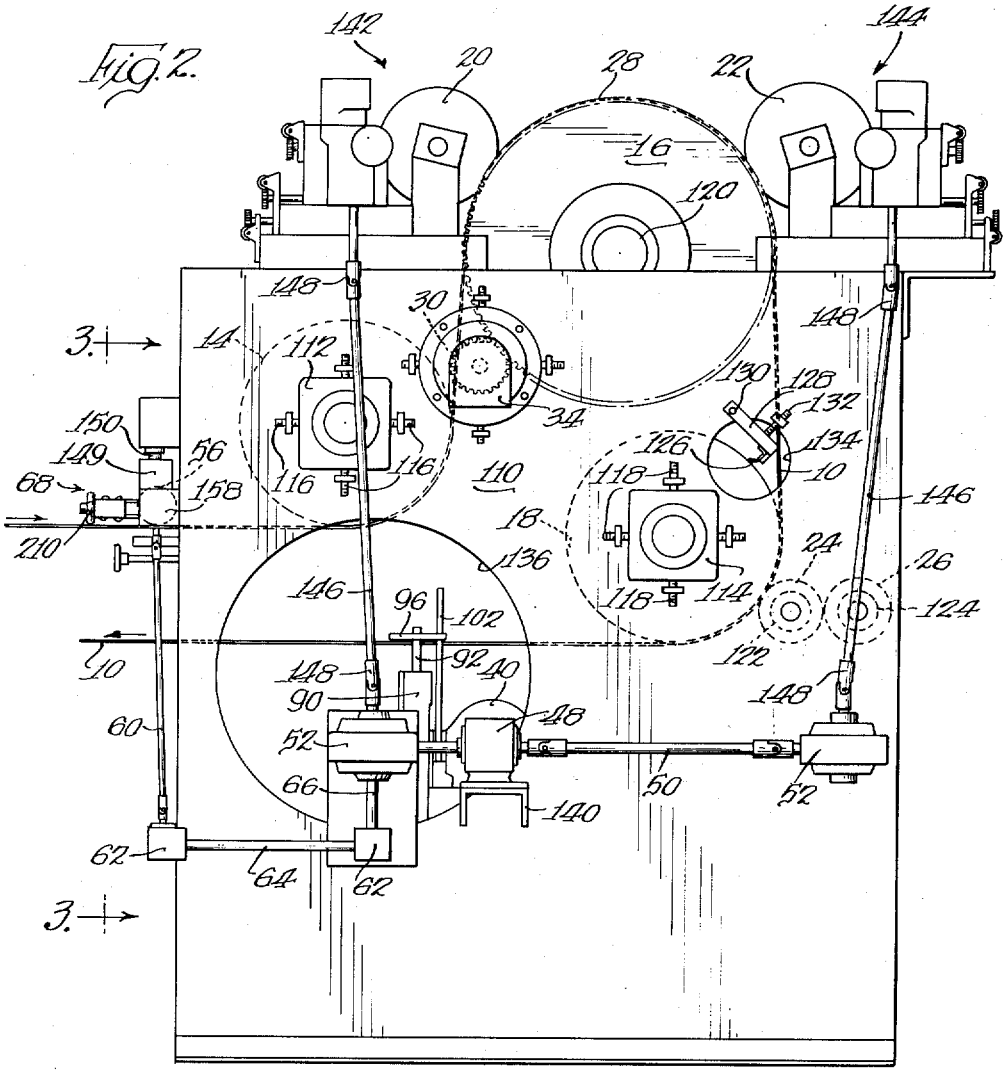
FIGURE 2 is a side elevation of the press schematically shown in FIGURE 1.
Figure 3:
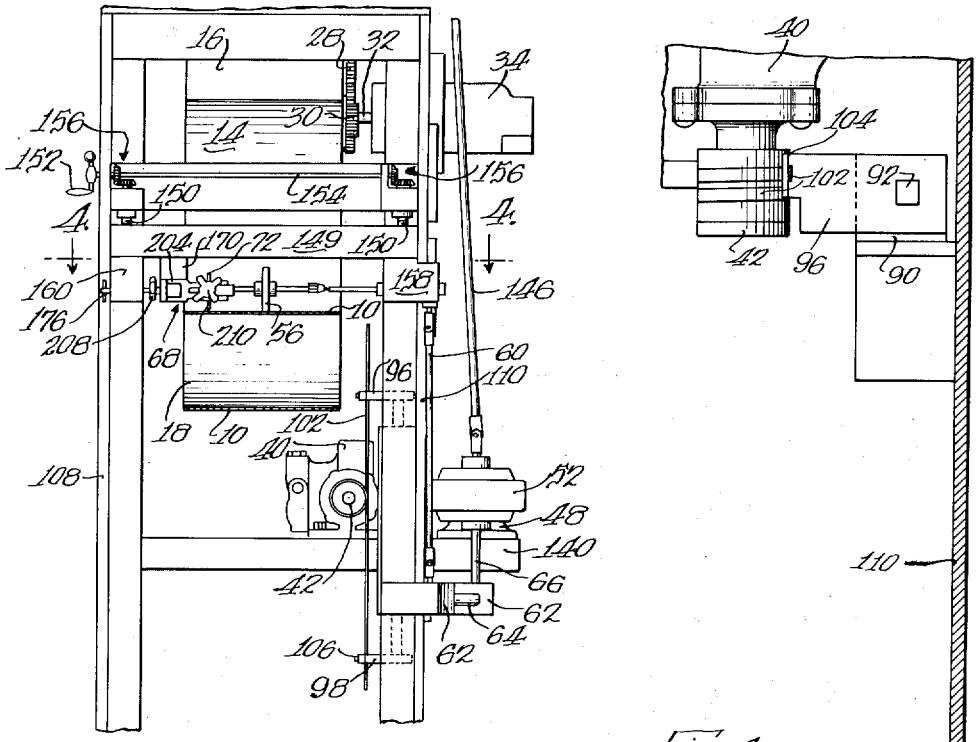
FIGURE 3 is an end view taken along the line 3—3 of FIGURE 2 in the direction indicated by arrows.
Figure 4:
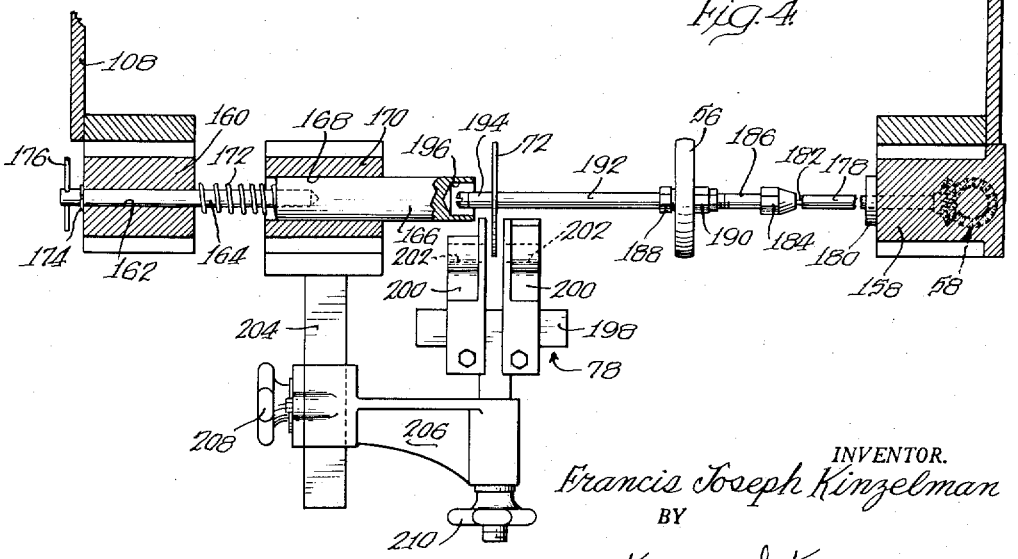
FIGURE 4 is a horizontal sectional view, partly in elevation, taken along the line 4—4 of FIGURE 3 in the direction indicated by arrows.

Referring to FIGURES 2 to 4, it will be seen that general support of the mechanism is provided by a pair of vertical plates or frame members 108 and 110, the latter being the front support member and the former the rear support member as viewed in FIGURE 2. The guide rollers or idlers 14 and 18 are journaled in suitable bearings 112 and 114 having positioning adjustments 116 and 118 respectively. The pump or motor 34 is similarly mounted on the front plate 110. The back-up roll or drum 16 is mounted in bearings 120 at the top edges of the support plates. The lacquer roll 24 and the feed roll 26 are similarly mounted in bearings 122 and 124. The idler roller 18 which serves as the back-up for the lacquer roll 24 is provided with a doctor or scraper blade 126 pivotally supported on the plates 110 and 108 by support rods 128 pivoted at 130, adjusting screws 132 being provided to adjust the scraping pressure of the blade 126. The plates 108 and 110 are apertured at 134 so that the adjusting screws 132 may be located on the outside faces of the support plates, thus permitting ready access for the purpose of adjustment. The scraper or doctor blade 126 is employed to scrape lacquer off the idler 18, in the event that lacquer should flow onto the idler from the opposite side of the strip, where the lacquer is applied. The motor or pump 40 and the cylinder 90 are mounted on the inner surface of the front plate 110, larger apertures 136 being provided in the side plates to permit access to this portion of the mechanism.

The transmission or gear box 48, which is coupled to the pump or motor 40 by a short shaft 138 (see FIGURE 1) is mounted on a suitable mounting bracket 140 on the exterior of the front plate 110. The gear boxes or transmissions 52 are coupled to the printing heads 142 and 144 by shafts 146 and universal couplings 148, the latter permitting motion of the printing mechanisms or heads without interfering with the mechanical transmission. The heads 142 and 144 are of conventional construction, including suitable inking facilities and positioning adjustments for the print and feed rolls and siutable means for lifting the print rolls in response to the switch 107, and are accordingly not further described herein.

The "walking wheel" assembly, as shown especially well in FIGURE 3, is suspended from a transverse bar 149 extending between the ends of the front and back plates 110 and 108. The bar 149 is vertically adjustable by means of adjusting screws of 150 operable by manual crank 152 through a shaft 154 and sets of bevel gears 156. To the lower edge of the bar 149 at the ends thereof are secured front and rear blocks or housings 158 and 160 respectively. Positioned for sliding motion in an aperture 162 in the rear block 160 is a rod 164 having at the end thereof an additional rod or bar 166, the latter being slidable in an aperture 168 in an additional support block 170 likewise secured to the lower edge of the bar 149. A spring 172 is compressed between the forward end of the rear block 160 and the rearward end of the enlarged rod or bar 166, the spring 172 surrounding the forward end of the rod 164. A snap ring 174 near the outer end of rod 164 limits the motion of the rods 164 and 166 in the forward direction under the urging of the spring 172, and a T-handle 176 is provided to permit withdrawal of the rod 166, for purposes hereinafter to be described.

The block 158 serves as a support and container for the bevel gears 58. A rigid shaft 178 is journaled in a suitable bearing 180 and terminates at its outer end in a flexible segment 182, the end of which is mounted in a collet chuck 184 on the end of another rigid shaft 186, upon which the metering wheel 56 is mounted by appropriate mounting nuts 188 and 190. The wheel 72, which is of somewhat smaller diameter, is mounted in an extension shaft 192, of which the outer end 194 is approximately centered in a bore 196 in the end of the rod or bar 166, the diameter of the bore 196 being much greater than the diameter of the end 194 of the shaft, so that the shaft is able to move back and forth freely within the limits set by the diameter of the bore 196. The position of the end 194 of the shaft 192 constitutes an accurate indicator of flexing of the flexible segment 182 of the shaft assembly. Departure of the end 194 from the center of the bore 196 indicates corresponding departure of the shaft assembly from exact linearity, thus indicating bending of the flexible shaft segment 182 in a horizontal or vertical direction, or both. The bore 196 serves as a limit stop for the end 194 of the shaft 192, thus also serving to prevent damage to the flexible segment 182 which might otherwise result from over-flexing. For example, it will be seen that when there is no web being fed to the mechanism, the weight of the shafts 186 and 192 and of the wheel 56 would bend the flexible segment 182 essentially to a right angle. With the structure illustrated, however, when no web is present, the end 194 merely rests in the interior of the bore 196. In setting up the machine for operation, the bar 148 is lowered by means of the crank 152 until the end 194 of the shaft 192 is vertically centered in the bore 196, the wheel 56 resting on the web. This adjustment, of course, may be remade if necessary during the printing run.

The sensing yoke 78 is formed of a crossbar 198 to which are attached spaced arms 200 transversely apertured at 202, and adapted for the connection of suitable tubing (shown only in FIGURE 1).

A bar or rod 204 extending from the support block 170 serves as a slide or guide for a carriage 206 on which the yoke 78 is mounted. A lock knob 208 permits coarse adjustment of the position of the yoke 78 with respect to the wheel 72. A vernier knob 210 provides for fine adjustment of the position of the yoke 78 to facilitate getting the walking wheel 72 precisely centered in its stroke at equilibrium. Vernier adjustment of the yoke 78 of course produces a corresponding adjustment of the equilibrium position of the walking wheel 72, since said wheel 72 at equilibrium is always in the center of its yoke 78. Hence, the vernier enables the operator to precisely center the shaft 194 when the condition of equilibrium is initially being set up, so that the flexible segment 182 thereafter will be straight whenever said wheel 72 is in its equilibrium position.

It has been stated above that although the wheel 56 may be employed with a variety of print roll sizes by employing suitable gearing between the wheel 56 and the print rolls, the employment of different size wheels 56 may be used to interpolate repeat pattern lengths differing from the circumferences of the print rollers. For this purpose, the wheel 56 is made readily replaceable. The bar 166 may be withdrawn by use of the T-handle 176 to free the end of the shaft 192, and the collet 184 may be loosened to remove the entire assembly of shafts 186 and 192 and wheels 56 and 72 from the flexible segment 182. The wheel 56 may then be removed and replaced by means of the nuts 188 and 190 adjoining the shaft segments 186 and 192.

Persons skilled in the art will readily select suitable components for practicing the method of the invention and for embodying the teachings of the apparatus aspect of the invention in suitable form. Components which have been found satisfactory for use in the embodiment illustrated in the drawing, for purposes of controlling the long-term and short-term register in the manner described are as follows: The components of the hydraulic flow system are pumps and motors manufactured by Oilgear Co., pumps or motors 36 and 40 being designated as type AS–311, pump or motor 34 being designated as type H–1211, and pump 46 being designated as type AP–311. The sensing and controlling system including the nozzles or arms 200 (corresponding to the arms 74 and 76 of FIGURE 1), the control mechanism 86, and the piston and cylinder 90 are commercially manufactured by Askania Regulator Company as an edge position control for web guiding, these components being described in Bulletin 155 and Bulletin 161 bearing notice of copyright by that company in the year 1953.

It will of course be seen that certain features of the method practiced by the described apparatus may be practiced by the use of completely different apparatus, or even by hand on conventional apparatus. It will also be apparent to those skilled in the art that the basic teachings of the invention may be applied in the design of printing presses and other continuous web machines vastly different from the printing press selected for purposes of illustration and description.

*Thus it will be apparent from the foregoing description, taken together with the accompanying drawings, that this invention provides a short term register system for imprinting and decorating metal and similar relatively rigid material in strip form, comprising a method of, and means for, drawing a strip to be printed or decorated lengthwise along a defined path; applying to a printing roller, mounted at a fixed location along said defined path and which is engaged with the strip, a torque which is independent of its engagement with the strip and by which the printing roller tends to be rotated at a circumferential speed equal to the average linear speed of the strip; and deriving from the strip itself such energy as is necessary for augmenting or diminishing such applied torque to maintain the circumferential speed of the printing roller equal to the actual momentary linear speed of the strip at said location. It will be further apparent that the invention provides a long term register system for imprinting and decorating strip material of the character described which comprises a method of, and means for, driving a printing roller at a*

*variable speed; producing an output which is a function of the rotational speed of the printing roller in relation to the local linear speed of the strip at a monitoring station which is preferably adjacent to the printing roller, utilizing energy derived from the strip itself in the production of such output; and applying that output to the variable speed drive means for the printing roller, to control the rate of rotation of the printing roller.*

Accordingly, the scope of the protection to be afforded the invention shall not be limited by the particular embodiment of the invention herein illustrated and described, but shall be limited only by the appended claims.

What is claimed is:

1. In a rotary web press having a printing train comprising a print roll and a back-up roll, a drive mechanism for the print roll comprising a hydraulic pump, coupling means connecting the shaft of the pump to the back-up roll, a hydraulic motor, coupling means connecting the shaft of the motor to the print roll, a hydraulic flow system including a connection between the outlet of the pump and the inlet of the motor, and a source of inverse pressure across the pump to balance the forward pressure developed by the pump at normal speed, whereby the print roll is driven by and in synchronism with the web without placing a mechanical load on the web.

2. In a rotary web press having a printing train comprising a print roll and a back-up roll, a drive mechanism for the print roll comprising a constant-delivery hydraulic pump, coupling means connecting the shaft of the pump to the back-up roll, a variable displacement hydraulic motor, coupling means connecting the shaft of the motor to the print roll, a hydraulic flow system including a connection between the outlet of the pump and the inlet of the motor, and a source of inverse pressure across the pump to balance the forward pressure developed by the pump at normal speed, whereby the print roll is driven by and in synchronism with the web without placing a mechanical load on the web, and the relative speeds of the print roll and the back-up roll may be varied by varying the displacement of the hydraulic motor.

3. In a rotary web machine for operating on metal webs having a rotary operating member in contact with the web and a web-driven member, a drive mechanism for the operating member comprising a hydraulic pump, coupling means connecting the shaft of the pump to the web-driven member, a hydraulic motor, coupling means connecting the shaft of the motor to the operating member, a hydraulic flow system including a connection between the outlet of the pump and the inlet of the motor, and a source of inverse pressure across the pump to balance the forward pressure developed by the pump at normal speed, whereby the rotary operating member is driven by and in synchronism with the web without placing a mechanical load on the web.

4. In a rotary web press having a printing train comprising a print roll and a back-up roll, said back-up roll being driven by the web in substantial synchronism therewith, a drive mechanism for the print roll comprising a hydraulic pump, coupling means connecting the shaft of the pump to the back-up roll, a hydraulic motor, coupling means connecting the shaft of the motor to the print roll, and a hydraulic flow system including a connection between the outlet of the pump and the inlet of the motor, whereby the print roll is driven by and in synchronism with the web.

5. In a rotary web press having a print roll and a back-up roll, a drive mechanism between the print roll and the back-up roll comprising a variable-speed transmission interconnecting the back-up roll and the print roll, cumulative differential sensing means coupled to the web and to the print roll and responsive to differences between the cumulative length of web passing through the press and the cumulative distance traveled by the periphery of the print roll, and means responsive to the sensing means and coupled to the transmission to vary the speed ratio of the transmission in the direction to equalize said cumulative length and said cumulative distance.

6. In a continuous web machine having a cyclic operating member and a web-driven member, a drive mechanism between the operating member and the web-driven member comprising a variable-speed transmission interconnecting the members, cumulative differential sensing means coupled to the web and to the operating member and responsive to differences between the cumulative length of web passing through the press and the cumulative distance corresponding to the cumulative cycling of the operating member, and means responsive to the sensing means and coupled to the transmission to vary the speed ratio of the transmission in the direction to equalize said cumulative length and said cumulative distance.

7. In a rotary press for metal strip having a printing train comprising a print roll and a back-up roll, a continuously variable-ratio transmission interconnecting and synchronizing the rolls, a drive constructed and arranged to draw a conitnuous metal strip over the back-up roll, said drive being independent of the printing train and connected thereto only by a strip being worked upon, and means coupled to the web and to the print roll to vary the ratio of the transmission in accordance with differences between the speed of the web and the speed of the print roll.

8. A long-term register control for a continuous web machine of the type having a web operating member, comprising a shaft, a rolling member mounted on the shaft, means for coupling the shaft to the web operating member to rotate said rolling member in time relation to the operation of said operating member, means for mounting the shaft transversely of the web and providing for yielding motion along the web, position-sensing means in operative relation to the rolling member to sense the position thereof, and means responsive to the position-sensing means to vary the speed of the web operating member in accordance with the departure of the rolling member from zero register position.

9. A long-term register control for a continuous web machine of the type having a web operating member, means for driving the operating member, and means for feeding the web to the operating member, comprising a shaft, a rolling member mounted on the shaft, means for coupling the shaft to the web operating member to rotate said rolling member in time relation to the operation of said operating member, means for mounting the shaft transversely of the web and providing for yielding motion along the web, position-sensing means in operative relation to the rolling member to sense the position thereof, and means responsive to the position-sensing means to vary the relative speeds of the operating member driving means and the web feeding means in accordance with the position of the rolling member.

10. A register control for a rotary web press having a printing train comprising a print roll and a back-up roll, said control comprising short term register and long-term register control means; said short-term register control means including drive means coupled to said print roll, drive means coupled to said back-up roll, adjustable drive rate control means connecting said print roll drive means to said back-up roll drive means, whereby any changes in speed of the back-up roll cause coordinate changes in speed of the print roll; said long-term register control means including sensing means coupled to the print roll and adapted to be coupled to a web being fed to the press to sense differentials between the total length of web passing through the press and the total peripheral distance traveled by the print roll, and means responsive to the sensing means for adjusting the said adjustable drive rate control means to alter the speed of the print roll upon appearance of a differential until the differential is eliminated.

11. A register control for a continuous web machine having a cyclic operating member and a web driven member, said control comprising short-term register and long-term register control means; said short-term register control means including drive means coupled to said cyclic operating member, drive means coupled to said web driven member, adjustable drive rate control means connecting said cyclic operating member drive means to said web driven member drive means, whereby any changes in speed of the web driven member cause coordinate changes in speed of the cyclic operating member; said long-term register control means including sensing means coupled to the cyclic operating member and adapted to be coupled to a web being fed to the press to sense differentials between the total length of web passing through the press and the total peripheral distance traveled by the cyclic operating member, and means responsive to the sensing means for adjusting the said adjustable drive rate control means to alter the speed of the cyclic operating member upon appearance of a differential until the differential is eliminated.

12. A register control for a rotary web press having a printing train comprising a print roll and a back-up roll, said register control comprising short-term register and long-term register control means; said short-term register control including drive means coupled to said print roll, driven means coupled to said back-up roll, adjustable drive rate control means connecting said print roll drive means to said back-up roll drive means, whereby any changes in speed of the back-up roll cause coordinate changes in speed of the print roll; said long-term register control means including means for passing successive longitudinal portions of a web through the printing train while the print roll is being continuously rotated by the said drive means to produce impressions on the web at predetermined equal spacings, differential web speed sensing means including a walking wheel sensing element mounted transversely of the web and adapted to be rotated by the first said drive means peripherally in contact with said web, departures of the speed of rotation of said wheel from a predetermined speed constituting a signal and being directly proportional to differences between the cumulative length of web passing through the press and the cumulative peripheral distance traveled by the print roll, means for transmitting said signal, and control means responsive to signals from the sensing element to vary correspondingly and correctively the speed of the first said drive means, whereby differences arising between the cumulative length of web passing through the press and the cumulative peripheral distance traveled by the print roll are substantially eliminated.

13. A register control for a continuous web machine having a cyclic operating member and a web driven member, said register control comprising short-term and long-term register control means; said short-term register control means including drive means coupled to said cyclic operating member, drive means coupled to said web driven member, adjustable drive rate control means connecting said cyclic operating member drive means to said web driven member drive means, whereby any changes in speed of the web driven member cause coordinate changes in speed of the cyclic operating member; said long-term register control means including means for passing successive longitudinal portions of a web into position to be operated upon by the operating member while the operating member is being driven by the first of said drive means, in repetitive cycles to produce operations on the web at predetermined equal spacings, differential web speed sensing means including a walking wheel sensing element mounted transversely of the web and adapted to be rotated by the first said drive means peripherally in contact with said web, departures of the speed of rotation of said wheel from a predetermined speed constituting a signal, means for transmitting said signal, and control means responsive to signals from the sensing element to vary correspondingly and correctively the speed of the first said drive means, whereby said predetermined equal spacing is maintained between said repetitive operation cycles.

14. In a rotary press for metal strip having a printing train comprising a print roll and a back-up roll, a variable-speed ratio transmission interconnecting and synchronizing the rolls, a drive constructed and arranged to draw a continuous metal strip over the back-up roll, said drive being independent of the printing train and connected thereto only by a strip being worked upon, and means coupled to the web and to the print roll to vary the ratio of the transmission in accordance with differences between the speed of the web and the speed of the print roll.

15. In a rotary printing press for performing successive printing operations on a strip as it passes through the press, a first drive means for causing the strip to move continuously through the press, a back-up roll which turns with the passage of the strip and around which the strip is partially wrapped in its movement through the press, a print roll which also turns with the passage of the strip and which thereby effects the said printing operations on the strip as backed up by the back-up roll, a second drive means for effecting the said turning of the print roll, adjustable means for the second drive means, and means responsive according to the average lineal speed of the strip for controlling the adjustable means to cause the second drive means to effect its said turning of the print roll at an average peripheral speed which is greater than the lineal speed of the compressed inside surface of the strip portion contacting the back-up roller but is less than the lineal speed of the stretched outside portion of the last said strip portion.

16. The combination, in a strip-processing machine for effecting a series of impressions on a strip of material which are uniformly spaced along the strip, the machine having an inlet and an outlet for the said strip, of means establishing a comparison and an impression location within the machine along the path of the strip, with the comparison location preceding the impression location along such path, a first drive means operative at the outlet of the machine to pull the strip of material longitudinally through the machine at a speed which is subject to comparative variations at the said locations, impressing apparatus at the impressing location operable, when driven in predetermined timed relationship to the speed at which the strip is moved through the impression location, to effect the said impressions in succession, a second drive means for driving the impressing apparatus, speed-comparing means at the said comparison location for effecting a continuous comparison between the said speed at which the strip is currently being pulled through the comparison location and the said speed at which the impression apparatus is currently being driven, the speed-comparing means including comparative-speed indicating means which effects a variable-extent below-normal, a normal, and a variable-extent above-normal indication of the driven speed of the impression apparatus with respect to that which is in the said timed relationship, and speed-regulating means controlled by the said comparison-speed indicating means for effecting corrective adjustments in the speed of one of the said drive means responsive to said below-normal and above-normal indications and according to the extent thereof.

17. The combination, in a strip-processing machine for effecting a series of impressions on a strip of material which are uniformly spaced along the strip, of means establishing an impression location within the machine, a first drive means for driving the strip of material longitudinally through the impression location at a speed which is subject to variations, impressing apparatus operable, when driven in predetermined timed relationship to the speed at which the strip is driven through the impression location, to effect the said impressions in succession at the impression location, a second drive means for driving the impressing apparatus, speed-comparing means for effecting a continuous comparison between the said speed at which the strip is currently being driven and the said speed at which the impression apparatus is currently being driven, the speed-comparing means including comparative-speed indicating means which effects a variable-extent below-normal, a normal, and a variable-extent above-normal indication of the driven speed of the impression apparatus with respect to that which is in the said timed relationship, and speed-regulating means controlled by the said comparison-speed indicating means for effecting corrective adjustments in the speed of one of the said drive means responsive to said below-normal and above-normal indications and according to the extent thereof.

18. The combination, in a strip-processing machine for effecting a series of impressions on a strip of material which are uniformly spaced along the strip, of means establishing an impression location within the machine, a first drive means for driving the strip of material longitudinally through the impression location at a speed which is subject to variations, impressing apparatus operable, when driven in predetermined timed relationship to the speed at which the strip is driven through the impression location, to effect the said impressions in succession at the impression location, a second drive means for driving the impressing apparatus, a cumulative speed-comparing means for effecting a continuous comparison between the said speed at which the strip is currently being driven and the said speed at which the impression apparatus is currently being driven, the comparing means including an indicator for giving a continuous indication of the cumulative relative speeds at which the strip and the impressing apparatus are being driven, the indicator having a normal position from which it is movable by the comparing means in opposing directions corresponding respectively to the low and high relative speeds of the impressing apparatus, the extent of the said movement at the indicator in either direction being proportional to the extent of the corresponding speed deviation multiplied by the time during which such deviation has endured, and speed-regulating means continuously under the control of the said indicator to regulate the speed of one of the said drive means, the speed-regulating means serving to hold the speed of the last said drive means at a constant value so long as the said indicator remains in its said normal position, and to change the speed of the last said drive means correctively from such value according to the direction, and proportional to the extent, of the said movement of the indicator from its normal position.

19. The combination, in a strip-processing machine for effecting a series of impressions on a strip of material which are uniformly spaced along the strip, of means establishing an impression location within the machine, a first drive means for driving the strip of material longitudinally through the impression location at a speed which is subject to variations, impressing apparatus operable, when driven in predetermined timed relationship to the speed at which the strip is driven through the impression location, to effect the said impressions in succession at the impression location, a second drive means for driving the impressing apparatus, the strip being more subject to deformities along the edges thereof than along its central portion, speed-comparing means for effecting a continuous comparison between the said speed at which the central portion of the strip is currently being driven and the said speed at which the impression apparatus is currently being driven, the speed-comparison means including a cumulative speed-departure indicator, and speed-regulating means controlled by the said indicator for effecting cumulative corrective adjustments in the speed of one of the said drive means.

20. In a strip-processing machine for effecting a series of impressions on a moving strip of material by an impressing device which effects the said impressions successively at a repetition rate which, for any selected rate of travel of the strip, determines the spacing of the impressions along the strip, strip-drive means for effecting continuous movement of the strip, impression-drive means for effecting continuous operation of the impressing device, spacing-control means for rendering the spacing of the impressions of average uniformity despite the tendency for either the rate of strip movement or the repetition rate of the impressing device to vary, the spacing-control means comprising a rate-comparing wheel and means for mounting it in continuous peripheral contact with a surface of the moving strip, while leaving the wheel free to move back and forth along the path of movement of such surface, means operatively coupling the comparing wheel with the impression drive means for rotation therewith at a peripheral rate of travel which equals the rate of travel of the said surface for a selected spacing of the impressions, the comparing wheel then remaining at a selected normal position of equilibrium, the wheel rolling back on the strip responsive to slower relative rates of strip movement and being carried forward on the strip responsive to faster relative rates of strip movement, speed-regulating means for one of the said drive means, and compensating means controlled according to the direction of either said displacement of the wheel from its said normal position for correctively controlling the said speed-regulating means to cause the comparing wheel to be returned to its said normal position of equilibrium.

21. In a strip-processing machine according to claim 20, wherein the said spacing-control means exercises its said control of the said speed regulating means in degrees of extent which vary directly with the extent of the said displacement of the said wheel.

22. In a web driven printing press having a printing couple, comprising a print roll and a back-up roll, means for counterbalancing the mechanical load of the printing couple on the web comprising a source of external power including an adjustable force pump, a constant displacement pump, means for hydraulically coupling said adjustable force pump to said constant displacement pump, and means for coupling said constant displacement pump to one member of said printing couple in driving relation thereto, whereby, when said web drives said printing couple, slippage between the web and the printing couple is substantially eliminated.

*23. In apparatus for printing impressions upon a continuous strip of metal or similar substantially stiff material by means of an impression roller which is mounted at a fixed location long a defined path of lengthwise strip travel and which roller is caused to rotate in engagement with the strip as the latter is moved past said location, means for continuously maintaining the circumferential speed of the impression roller in a predetermined ratio to the local linear speed of that portion of the strip which is passing said location so that the successive impressions made by the roller are unsmeared and are at exactly predetermined intervals along the length of the strip, said means comprising: means including first drive means for drawing a strip lengthwise along said defined path; second drive means for rotatably driving the impression roller at a variable rate; means for producing a continuous output which is a function of the rotational speed of the impression roller relative to the local linear speed of the strip at a monitoring station along said defined path, said output producing means comprising a strip speed responsive roller having its periphery in continuous engagement with the strip at said monitoring station; and means operatively associated with said second drive means and connected with the output producing means to be responsive to its output, for varying the rate at which the impression roller is driven by said second drive means in accordance with the output of the out-*

*put producing means and hence in accordance with variations in the speed of the strip at the monitoring station.*

*24. In apparatus for printing impressions upon a continuous strip of metal or similar substantially stiff material by means of an impression roller which is mounted at a fixed location along a defined path of lengthwise strip travel and which roller is caused to rotate in engagement with the strip as the latter is moved past said location, means for continuously maintaining the circumferential speed of the impression roller in a predetermined ratio to the local linear speed of that portion of the strip which is passing said location so that the successive impressions made by the roller are unsmeared and are at exactly predetermined intervals along the length of the strip, said means comprising: means including first drive means for drawing a strip lengthwise along said defined path; a strip speed responsive roller mounted and arranged to have its periphery engaged with the strip so as to be rotated by the strip at a circumferential speed which is equal to the linear speed of the strip at said location; torque transmission means drivingly connecting the impression roller and said strip speed responsive roller to constrain said rollers to rotate in synchronism; and constant-torque drive means drivingly connected with said rollers to impart enough torque to them to substantially overcome their friction and that of the transmission means, so that said rollers and transmission means present to the strip a very light mechanical load which assures that the strip speed responsive roller will accurately follow changes in said local linear speed of the strip without tending to slip relative to the strip, and so that the energy required for changes in the speed of the rollers by which they are kept synchronized with local linear movement of the strip is derived from changes in the local speed of the strip.*

*25. In apparatus for printing impressions upon a continuous strip of metal or similar substantially stiff material by means of an impression roller which is mounted at a fixed location along a defined path of lengthwise strip travel and which roller is caused to rotate in engagement with the strip as the latter is moved past said location, means for continuously maintaining the circumferential speed of the impression roller in a predetermined ratio to the local linear speed of that portion of the strip which is passing said location so that the successive impressions made by the roller are unsmeared and are at exactly predetermined intervals along the length of the strip, said means comprising: means including first drive means for drawing a strip lengthwise along said defined path; variable speed drive means connected with the impression roller and having a speed regulating element for changing the speed at which the impression roller is driven by said variable speed drive means; means for producing a continuous output which is a function of the circumferential speed of the impression roller relative to the local linear speed of the strip at a monitoring station along said defined path, said output producing means comprising a strip speed responsive roller having its periphery in continuous engagement with the strip at said monitoring station; and means operatively connecting said output producing means with the speed regulating element of said variable speed drive means to effect variation of the circumferential speed of the impression roller in accordance with the output of the output producing means and hence in accordance with the local linear speed of the strip at the monitoring station.*

*26. In the process of printing impressions upon a continuous strip of metal or similar substantially stiff material by means of an impression roller which is mounted at a fixed location along a defined path of lengthwise strip travel and which roller is caused to rotate in engagement with the strip as the latter is moved past said location, the method of continuously maintaining the circumferential speed of the impression roller exactly equal to the local linear speed of that portion of the strip which is passing said location so that the successive impressions made by the impression roller are unsmeared and are at exactly predetermined intervals along the length of the strip, which method comprises: drawing a strip lengthwise along said defined path; without reliance upon its engagement with the strip, applying to the impression roller a constant torque of a value which tends to rotate it at a peripheral speed that approximates the linear speed of the strip at said location; applying to a strip speed responsive monitor roller, peripherally engaged with the strip at a monitoring station, torque of such value as causes said monitor roller to rotate at a peripheral speed equal to that of the impression roller, regardless of variation in speed of rotation of the latter, thereby causing the monitor roller to present to the strip a light load which corresponds to the difference between the circumferential speed of the monitor roller and the linear speed of the strip at the monitoring station; producing a torsional force output corresponding to said load; and applying said torsional force output to the impression roller along with said constant torque, to modify the latter and thus supply to the impression roller a net torque which maintains the circumferential speed of the impression roller exactly in a predetermined ratio to the linear speed of the strip at the monitoring station.*

*27. In the process of printing impressions upon a continuous strip of metal or the like by means of an impression roller which is mounted at a fixed location along a defined path of lengthwise strip travel and which roller is caused to rotate in engagement with the strip as the latter is moved past said location, the method of continuously maintaining the circumferential speed of the impression roller in exactly a predetermined ratio to the local linear speed of that portion of the strip which is passing said location, regardless of variations in the speed of strip travel at said location, so that the successive impressions made by the roller are unsmeared and are at exactly predetermined intervals along the length of the strip, which method comprises: drawing a strip lengthwise along said defined path; without reliance upon engagement of the impression roller with the strip, applying to the impression roller a constant torque which tends to rotate the impression roller at a circumferential speed which approximates a predetermined ratio to the average linear speed of the strip at said location; continuously deriving from the moving strip, torsional force which is equal to the difference between the constant torque applied to the impression roller and the torque required to rotate the impression roller at a circumferential speed which bears exactly a predetermined ratio to the linear speed of the strip at said station; and applying to the impression roller the torsional force thus derived, along with said constant torque.*

*28. In apparatus for printing impressions upon a continuous strip of metal or similar substantially stiff material while the strip is drawn lengthwise along a defined path by pull-through means, and wherein impressions are made upon the strip by an impression roller mounted at a fixed location along said defined path and which is caused to rotate in engagement with the strip as the latter is moved past said location, means for causing the impression roller to so rotate in relation to the portion of the strip with which it is engaged that the impressions made thereby are unsmeared and are at exactly predetermined intervals along the length of the strip, said means comprising: variable speed drive means for rotating the impression roller independently of its engagement with a strip and at a rate which is independent of the rate at which the pull-through means draws the strip along said defined path; and control means for regulating the speed of the drive means, characterized by a monitor roller having its periphery in continuous engagement with the strip at a monitoring station along said defined path at which the local linear speed of the strip accurately corre-*

*sponds to its local linear speed at said impression roller location.*

References Cited in the file of this patent or the original patent

UNITED STATES PATENTS

| | | |
|---|---|---|
| 1,256,286 | Avery | Feb. 12, 1918 |
| 1,545,638 | Clay | July 14, 1925 |
| 2,003,800 | Barber | June 4, 1935 |
| 2,230,715 | Cockrell | Feb. 4, 1941 |
| 2,250,209 | Shoults et al. | July 22, 1941 |
| 2,560,774 | Luttenauer | July 17, 1951 |
| 2,570,045 | Bojanower et al. | Oct. 2, 1951 |
| 2,603,153 | Warren et al. | July 15, 1952 |
| 2,628,556 | Fay | Feb. 17, 1953 |
| 2,697,982 | Carlson | Dec. 28, 1954 |
| 2,816,504 | Smith | Dec. 17, 1957 |